United States Patent
Wei

(10) Patent No.: US 10,524,184 B2
(45) Date of Patent: Dec. 31, 2019

(54) FORWARDING CONTROL METHOD AND FORWARDING CONTROL APPARATUS

(71) Applicant: Beijing Zhigu Rui Tuo Tech Co., Ltd, Beijing (CN)

(72) Inventor: Na Wei, Beijing (CN)

(73) Assignee: Beijing Zhigu Rui Tuo Tech Co., Ltd, Beijing (CN)

(*) Notice: Subject to any disclaimer, the term of this patent is extended or adjusted under 35 U.S.C. 154(b) by 124 days.

(21) Appl. No.: 15/568,448

(22) PCT Filed: Apr. 22, 2016

(86) PCT No.: PCT/CN2016/079971
§ 371 (c)(1),
(2) Date: Oct. 20, 2017

(87) PCT Pub. No.: WO2016/169509
PCT Pub. Date: Oct. 27, 2016

(65) Prior Publication Data
US 2018/0146411 A1    May 24, 2018

(30) Foreign Application Priority Data

Apr. 24, 2015   (CN) .......................... 2015 1 0201508

(51) Int. Cl.
*H04W 40/02* (2009.01)
*H04W 4/46* (2018.01)
(Continued)

(52) U.S. Cl.
CPC ........... *H04W 40/026* (2013.01); *H04W 4/46* (2018.02); *H04W 4/70* (2018.02); *H04W 4/80* (2018.02)

(58) Field of Classification Search
CPC ........... H04W 4/70; H04W 4/04; H04W 4/80; H04W 40/026; H04W 4/46
See application file for complete search history.

(56) References Cited

U.S. PATENT DOCUMENTS 8,843,058 B2   9/2014  Senarath et al.
9,820,113 B2 * 11/2017  Klang .................. H04W 4/023
(Continued)

FOREIGN PATENT DOCUMENTS

CN    101720059 A    6/2010
CN    103596241 A    2/2014
(Continued)

OTHER PUBLICATIONS

International Search Report for PCT Application No. PCT/CN2016/079971, dated Jul. 18, 2016, 3 pages.
(Continued)

*Primary Examiner* — Gbemileke J Onamuti
(74) *Attorney, Agent, or Firm* — Amin, Turocy & Watson, LLP

(57) ABSTRACT

A forwarding control method and a forwarding control apparatus is provided. A method comprises: at least determining, in response to a forwarding demand of measured data of at least one mobile terminal, a distribution state of neighboring terminals associated with a forwarding expectation of the measured data of the at least one mobile terminal; and determining, at least according to the distribution state, a forwarding mode of the measured data corresponding to the distribution state. In response to a forwarding demand of measured data, a corresponding forwarding mode can be selected according to a distribution state of neighboring terminals, so as to avoid problems, such as signaling overhead, delay, and an over heavy air interface burden, which may be caused by blindly determining a forwarding channel, and assist in implementing more effective forwarding.

25 Claims, 5 Drawing Sheets

(51) Int. Cl.
*H04W 4/70* (2018.01)
*H04W 4/80* (2018.01)

(56) References Cited

U.S. PATENT DOCUMENTS

2007/0115895 A1* 5/2007 Ling .................. G01S 5/0289
370/338
2010/0194592 A1 8/2010 Yim et al.
2014/0051357 A1* 2/2014 Steer ................. H04L 63/0876
455/41.2

FOREIGN PATENT DOCUMENTS

| CN | 103607750 A | 2/2014 |
|----|-------------|--------|
| CN | 103826284 A | 5/2014 |
| CN | 105282257 A | 1/2016 |
| WO | 2014051473 A1 | 4/2014 |

OTHER PUBLICATIONS

"Work Item Proposal for Enhanced LTE Device to Device Proximity Services", Submitted by Qualcomm Incorporated at 3GPP TSG RAN Meeting #66, RP-142311 Maui, USA, Dec. 8-11, 2014, 8 pages.
Chinese Office Action dated May 23, 2019 for Chinese Application Serial No. 201510201508.2, 15 pages.

* cited by examiner

FORWARDING CONTROL METHOD AND FORWARDING CONTROL APPARATUS

RELATED APPLICATION

The present application is a U.S. National Stage filing under 35 U.S.C. § 371 of international patent cooperation treaty (PCT) application No. PCT/CN2016/079971, filed Apr. 22, 2016, and entitled "FORWARDING CONTROL METHOD AND FORWARDING CONTROL APPARATUS", which claims the benefit of priority to Chinese Patent Application No. 201510201508.2, filed on Apr. 24, 2015, which applications are hereby incorporated herein into the present application by reference in their respective entireties.

TECHNICAL FIELD

The present application relates to the field of technologies of the Internet of Vehicles, and, for example, to a forwarding control method and a forwarding control apparatus.

BACKGROUND

With the high-speed development of mobile device-related technologies, people have more and more demands on mobile devices, the application scenarios of the mobile devices are also more and more complex, and subsequently, measured data related to motion of a mobile terminal (for example, a moving speed, a position, a direction, and the like) can provide more convenience for a user. For example, in an on-board use application, a mobile terminal (a vehicle per se or another on-board mobile device (collectively referred to as a mobile terminal in this application)) can share measured data, comprising data, such as a speed, a position, a traveling direction, and braking, of a vehicle with another vehicle by means of Vehicle-to-Vehicle (V2V) communication, so as to provide a data basis for safer and more convenient traveling of a user.

A wireless network is needed for V2V communication, a dedicated short range communications (DSRC) technology is generally adopted, a DSRC network is a WiFi-like network, and a theoretical maximum coverage area thereof reaches 300 meters, but is actually shorter. A transmission range of an on-board mobile terminal can be expanded by using each mobile terminal as a forwarding node, but forwarding is still performed multiple times so as to achieve a broader transmission range, and once an event occurs, there is a limited time for user to deal with the event. The V2V communication may be assisted by using a cellular technology with a broader transmission range, for example, a Device-to-Device (D2D) communication technology in a cellular network system (for example, a Long Term Evolution (LTE) network system), and alternatively, the measured data is directly sent to a base station, then forwarded by the base station. With the assistance of the cellular technology, a transmission coverage area of a V2V signal can be enlarged. In a case in which the transmission coverage area of the V2V signal may be implemented through various forwarding channels, shortcomings remain.

SUMMARY

In view of the above, one example, of a non-limiting objective of embodiments of the present application is to provide a forwarding control solution that assists in implementing effective forwarding.

In order to achieve the foregoing objective, in a first aspect, an example embodiment of the present application provides a forwarding control method, comprising:

at least determining, in response to a forwarding demand of measured data of at least one mobile terminal, a distribution state of neighboring terminals associated with a forwarding expectation of the measured data of the at least one mobile terminal; and determining, at least according to the distribution state, a forwarding mode of the measured data corresponding to the distribution state, wherein, in the determined forwarding mode, the measured data of the at least one mobile terminal is to be forwarded by at least one type of forwarding node, and the at least one type of forwarding node comprises at least one type of forwarding node with a type different from that of forwarding nodes in other forwarding modes.

In a second aspect, an example embodiment of the present application provides a forwarding control apparatus, comprising:

a first determination module, configured to at least determine, in response to a forwarding demand of measured data of at least one mobile terminal, a distribution state of neighboring terminals associated with a forwarding expectation of the measured data of the at least one mobile terminal; and a second determination module, configured to determine, at least according to the distribution state, a forwarding mode of the measured data corresponding to the distribution state, wherein, in the determined forwarding mode, the measured data of the at least one mobile terminal is to be forwarded by at least one type of forwarding node, and the at least one type of forwarding node comprises at least one type of forwarding node with a type different from that of forwarding nodes in other forwarding modes.

In a third aspect, an example embodiment of the present application provides a computer readable storage device, comprising at least one executable instruction, which, in response to execution, causes a system comprising a processor to perform operations, comprising:

at least determining, in response to a forwarding demand of measured data of at least one mobile terminal, a distribution state of neighboring terminals associated with a forwarding expectation of the measured data of the at least one mobile terminal; and determining, at least according to the distribution state, a forwarding mode of the measured data corresponding to the distribution state, wherein, in the determined forwarding mode, the measured data of the at least one mobile terminal is to be forwarded by at least one type of forwarding node, and the at least one type of forwarding node comprises at least one type of forwarding node with a type different from that of forwarding nodes in other forwarding modes.

In a fourth aspect, an example embodiment of the present application provides a device for forwarding control device comprising a processor and memory, wherein the memory storing a computer executable instruction, the processor being connected with the memory via a communication bus, and when the device is operating, the processor executes or facilitates execution of the executable instructions stored by the memory:

at least determining, in response to a forwarding demand of measured data of at least one mobile terminal, a distribution state of neighboring terminals associated with a forwarding expectation of the measured data of the at least one mobile terminal; and determining, at least according to the distribution state, a forwarding mode of the measured data corresponding to the distribution state, wherein, in the determined forwarding mode, the measured data of the at least one mobile terminal is to be forwarded by at least one type of forwarding node, and the at least one type of forwarding node comprises at least one type of forwarding node with a type different from that of forwarding nodes in other forwarding modes.

Example embodiments of the present application can select, in response to a forwarding demand of measured data, a corresponding forwarding mode according to a distribution state of neighboring terminals, so as to avoid problems, such as signaling overhead, delay, and an over heavy air interface burden, that may be caused by blindly determining a forwarding channel, and assist in implementing more effective forwarding.

DETAILED DESCRIPTION

Example embodiments of the present application are further described in detail below with reference to the accompanying drawings and embodiments. The following embodiments are intended to describe the present application, but not to limit the scope of the present application.

It should be understood that the terms "first", "second", and the like are merely used to distinguish different devices, modules, parameters, and the like, and neither represent any special technical meaning, nor represent a necessary logical sequence therebetween.

In each embodiment of the present application, the "mobile terminal" may be any movable device or any device capable of moving driven by a movable platform (for example, a transport tool) and is a user equipment with signal receiving and transmitting functions. Such a device may comprise any terminal device, for example, a mobile phone, a wearable device, a PC, a vehicle, an on-board device, and any other portable device.

Figure 1:
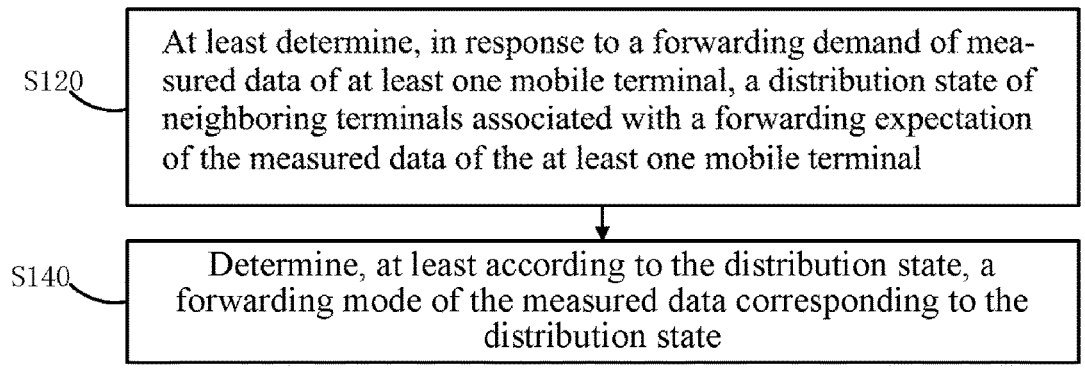
FIG. 1 is an example flowchart of an example of a forwarding control method of an embodiment of the present application.

FIG. 1 is a flowchart of a forwarding control method of an embodiment of the present application, wherein the method may be executed by any base station, may also be executed by any mobile terminal, and may also be executed by an independent third-party apparatus. As shown in FIG. 1, the method comprises:

S120. At least determine, in response to a forwarding demand of measured data of at least one mobile terminal, a distribution state of neighboring terminals associated with a forwarding expectation of the measured data of the at least one mobile terminal.

In each embodiment of the present application, the "measured data" may comprise any information associated with a running state or a device state of the mobile terminal, that is, comprising information associated with at least one of the following of the mobile terminal: a motion speed, a position, a motion direction, braking, and the like. In the method of the embodiment of the present application, when the measured data of the at least one mobile terminal is need to be forwarded, at least a distribution state of neighboring terminals associated with a forwarding expectation of the measured data of the at least one mobile terminal is determined. The forwarding demand may comprise a demand for starting forwarding or switching a forwarding mode caused by triggering forwarding of the measured data or triggering the switch of the forwarding mode of the measured data. The "neighboring terminals" refers to any other mobile terminals. The distribution state of the neighboring terminals comprises at least one of the following: number, density, and the like. The forwarding expectation may comprise, but is not limited to, at least one of the following: a target forwarding coverage area, a target forwarding number, that is, a target number of mobile terminals capable of receiving the measured data, and the like. The forwarding expectation can be determined in any way or can be determined according to the measured data of the mobile terminal, for example, if it is deduced from a moving speed and a braking situation of the mobile terminal that the mobile terminal is braking in emergency and may be in an accident scenario, a larger target forwarding coverage area is determined.

S140. Determine, at least according to the distribution state, a forwarding mode of the measured data corresponding to the distribution state, wherein, in the determined forwarding mode, the measured data of the at least one mobile terminal is to be forwarded by at least one type of forwarding node, and the at least one type of forwarding node comprises at least one type of forwarding node with a type different from that of forwarding nodes in other forwarding modes.

In the method of the present embodiment, the type of the forwarding node comprises, but is not limited to, at least one neighboring terminal and the base station of a cell to which the mobile terminal attaches. The corresponding forwarding mode may comprise: a forwarding mode where only taking at least one neighboring terminal as a forwarding node; a forwarding mode where taking at least one neighboring terminal and the base station of a cell to which the mobile terminal attaches as forwarding nodes; and a forwarding mode where only taking the base station of a cell to which the mobile terminal attaches as a forwarding node. In the case where at least one neighboring terminal serves as a forwarding node, a corresponding forwarding channel is performing forwarding among respective neighboring terminals; When taking the base station of a cell to which the mobile terminal attaches as a forwarding node, a forwarding channel comprises performing forwarding to another mobile terminal in the present cell through the base station, or performing forwarding to a base station in a neighboring cell through the base station, so as to achieve a broader forwarding coverage area through the base station of the neighboring cell, or performing forwarding to another mobile terminal in the present cell and a base station in the neighboring cell through the base station; in the case where both the base station of the cell to which the mobile terminal attaches and each neighboring terminal serve as forwarding nodes, a forwarding channel is a combination of the foregoing forwarding channels or the like.

The distribution state can directly reflect a forwarding condition of the measured data of the at least one mobile terminal, and on the basis of the distribution state, a more effective forwarding mode can be determined. For example, if the distribution of neighboring terminals associated with the forwarding expectation of the measured data is relatively dense, overall forwarding coverage in this forwarding range can be achieved in just a D2D communication manner. If distribution of the neighboring terminals in the target forwarding coverage area is less dense, more hops and/or more forwarding nodes may be used to achieve the overall forwarding coverage in this forwarding range in D2D and DSRC communication manners, or in a DSRC communication manner; alternatively, if the looseness level of distribution of the mobile terminals in the expected forwarding range goes beyond a D2D forwarding capability and/or a DSRC forwarding capability, and the overall forwarding coverage in the target forwarding coverage area cannot be achieved, a manner of using the base station of the cell to which the mobile terminal attaches as a forwarding node may be adopted, wherein the base station forwards the measured data directly to the present cell or indirectly to a neighboring terminal in a neighboring cell, so as to achieve the overall forwarding coverage in the target forwarding coverage area.

The method of the present embodiment can select, in response to a forwarding demand of the measured data, a corresponding forwarding mode according to a distribution state of neighboring terminals, so as to avoid problems, such as signaling overhead, delay, and an over heavy air interface burden, that may be caused by blindly determining a forwarding channel, and assist in implementing more effective forwarding.

In an example embodiment, the forwarding expectation of the at least one mobile terminal comprises information associated with the target forwarding coverage area. In such an example embodiment, step S120 may further comprise:

S122. Determine, at least according to the forwarding expectation of the at least one mobile terminal, a target forwarding coverage area.

S124. Determine, at least according to information associated with a position of a neighboring terminal in the determined target forwarding coverage area, a distribution state of neighboring terminals in the target forwarding coverage area.

Information associated with a position of a neighboring terminal can be determined according to a signal sent from the neighboring terminal. For example, a V2V signal sent by the neighboring terminal comprises information associated with its position relationship (GPS information). Alternatively, from the base station of the cell to which the at least one mobile terminal attaches, position information of a neighboring terminal in this cell can be directly acquired, or position information of a neighboring terminal in the neighboring cell can be indirectly acquired.

In another example embodiment, step S120 may further comprise:

S122'. Determine, at least according to a direct transmission coverage area of the at least one mobile terminal, respective target forwarding coverage area of each of the at least one mobile terminal.

The direct transmission coverage area refers to a transmission coverage area of a D2D or DSRC signal of the mobile terminal, and as shown in FIG. 2(*a*), a maximum transmission distance of a D2D signal of UE1 in a cell coveraged by a base station BS1 is R1, and a direct transmission coverage area thereof is a circular shadowed area with UE1 as a center of circle and R1 as a radius. Therefore, a target forwarding coverage area of UE1 could be determined.

S124'. Determine, at least according to a signal received by the at least one mobile terminal from another neighboring terminal, a distribution state of neighboring terminals in the target forwarding coverage area.

According to a signal received by the at least one mobile terminal from a neighboring terminal, a relative position relationship between the at least one mobile terminal and the neighboring terminal corresponding to the signal could be deduced, or the signal may comprise information associated with the position of the corresponding neighboring terminal, for example, a V2V signal sent by the neighboring terminal comprises information associated with its position relationship (GPS information). Further, a distribution state of neighboring terminals in the target forwarding coverage area is determined.

In another example embodiment, the forwarding expectation does not clarify a target forwarding coverage area, but comprises information such as an expected forwarding number only. In such an example embodiment, the target forwarding coverage area may be deduced according to the forwarding expectation. Specifically, step S120 may further comprise:

S122": Determine respective at least one expected forwarding coverage area of each of the at least one mobile terminal.

At least one expected forwarding coverage area can be determined in sequence or at the same time for each mobile terminal.

S124". Determine, at least according to a distribution state of neighboring terminals in the at least one expected forwarding coverage area of each of the at least one mobile terminal and the forwarding expectation of the at least one mobile terminal, a target forwarding coverage area of each of the at least one mobile terminal.

As stated above, a coverage area of a neighboring terminal in the at least one expected forwarding coverage may be determined according to a signal sent by the neighboring terminal, or position information of a neighboring terminal in the cell directly acquired from the base station of the cell to which the at least one mobile terminal attaches, or position information of a neighboring terminal in a neighboring cell indirectly acquired from the base station of the cell to which the at least one mobile terminal attaches, and an expected forwarding coverage area that can satisfy or almost satisfy the forwarding expectation is determined, according to a forwarding expectation of each mobile terminal, as the target forwarding coverage area.

As shown in FIG. 2(*b*), a forwarding target of UE1 is that the number of neighboring terminals capable of receiving the measured data of UE1 is a first number. Three expected forwarding coverage areas (shown as three dashed-line circles) can be determined at the same time or in sequence for UE1 in the cell coveraged by BS1, according to a V2V signal of another UE in the present cell, a base station BS1 in the present cell, and communication between a neighboring cell base station BS2 and the present base station BS1, a distribution state of neighboring terminals in each expected coverage area can be determined, and it is determined that the number of neighboring terminals in the middle expected forwarding coverage area can satisfy the forwarding target, so as to determine the target forwarding coverage area of the middle expected forwarding coverage area.

Alternatively, information associated with a position of a neighboring terminal can be determined according to a signal sent from the neighboring terminal. For example, a V2V signal sent by the neighboring terminal comprises information associated with its position relationship (GPS information). Alternatively, from the base station of the cell to which the at least one mobile terminal attaches, position information of a neighboring terminal in this cell can be directly acquired, or position information of a neighboring terminal in the neighboring cell can be indirectly acquired.

In addition, as stated above, according to a distribution state of neighboring terminals associated with the forwarding expectation of the measured data of the at least one mobile terminal, a needed forwarding node can be determined, so as to further determine different forwarding modes corresponding to different forwarding nodes, that is, step S140 further comprises:

S142. Determine, at least according to the distribution state, at least one forwarding node associated with the measured data corresponding to the distribution state.

In another example embodiment, step S142 may further comprise:

S1422: Determine, in response to that the distribution state satisfies a preset condition, at least one neighboring terminal corresponding to the distribution state as the at least one forwarding node. Accordingly, the determined at least one forwarding node may correspond to a forwarding mode of forwarding measured data in a D2D communication manner and/or a DSRC communication manner.

S1442. Determine, in response to that the distribution state does not satisfy the preset condition, a base station of a cell to which a mobile terminal corresponding to the distribution state attaches as the at least one forwarding node. Accordingly, the corresponding forwarding mode is a forwarding mode of forwarding measured data in a communication manner of forwarding measured data directly to a neighboring terminal in the present cell and/or indirectly to a neighboring terminal in a neighboring cell through a base station of the cell to which the mobile terminal attaches or in a D2D communication manner and/or a DSRC communication manner at the same time.

The preset condition can be determined according to requirements of the system on the forwarding, for example, the preset condition is properly set according to a requirement on a channel congestion level, a delay requirement, and an air interface load requirement, for example, the preset condition is set to be that the distribution density of neighboring terminals is higher than a threshold, wherein the threshold is such a value satisfying that if the distribution density is the threshold, overall coverage in the target forwarding coverage area can be achieved by performing forwarding in a D2D manner and/or a DSRC manner.

In addition, setting the preset condition is affected, to some extent, by a motion state of the mobile terminal. For example, taking a threshold of the distribution density as an example, compared to the mobile terminal traveling at a relatively low speed, the relatively high speed would prolong an effective transmission distance of a D2D or a DSRC signal thereof. Therefore, when the mobile terminal travels at a relatively slow speed, the threshold could be properly increased; otherwise, the threshold could be decreased. The method of the present embodiment further comprises:

S112. Determine a motion state of the at least one mobile terminal.

In the case where the execution apparatus of the method of the present embodiment is independent from any mobile terminal, information associated with the motion state could be acquired in a manner of communicating with the mobile terminal, for example, acquiring a motion speed thereof.

S114. Determine, at least according to the motion state of the at least one mobile terminal, the preset condition corresponding to each of the at least one mobile terminal.

In an example embodiment in which an execution apparatus of the method of the present embodiment belongs to any mobile terminal, the method of the present embodiment further comprises:

S160. Send, according to the determined forwarding mode, the measured data corresponding to the at least one mobile terminal to at least one forwarding node, so as to implement effective forwarding.

In an example embodiment in which an execution apparatus of the method of the present embodiment is independent from any mobile terminal, the method of the present embodiment further comprises:

S180. Send information associated with the determined forwarding mode.

For example, performing transmission in a manner in which the mobile terminal can perform receiving.

In conclusion, the method of the present embodiment can assist in implementing effective forwarding.

It should be understood by a person skilled in the art that in various embodiments of the present application, the value of the serial number of each step described above does not mean an execution sequence, and the execution sequence of each step should be determined according to the function and internal logic thereof, and should not be any limitation on the implementation procedure of the embodiments of the present application.

In addition, an embodiment of the present application further provides a computer-readable medium, comprising a computer-readable instruction for performing the following operation when being executed: performing an operation of each step in the method of the embodiment shown in FIG. 1.

Figure 3A:
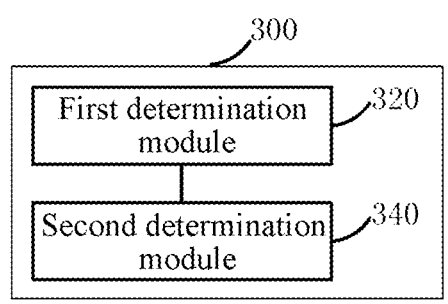
FIG. 3(a) to FIG. 3(f) are example schematic structural diagrams of multiple examples of a forwarding control apparatus of an embodiment of the present application.

An embodiment of the present application further provides an apparatus for executing the foregoing forwarding control method, and the apparatus may be an apparatus independent from any mobile terminal/base station or an apparatus belonging to any mobile terminal/base station. According to requirements of the foregoing different execution roles of the apparatus, in addition to each constituent part described below, the apparatus further comprises a communication module that can implement communication with any device outside the apparatus according to requirements. As shown in FIG. 3(a), a forwarding control apparatus 300 of an embodiment of the present application comprises:

A first determination module 320, configured to at least determine, in response to a forwarding demand of measured data of at least one mobile terminal, a distribution state of a neighboring terminal associated with a forwarding expectation of the measured data of the at least one mobile terminal.

In one or more embodiments of the present application, the "measured data" may comprise any information associated with a running state or a device state of the mobile terminal, that is, comprising information associated with at least one of the following of the mobile terminal: a motion speed, a position, a motion direction, braking, and the like. In the method of the embodiment of the present application, when the measured data of the at least one mobile terminal is need to be forwarded, at least a distribution state of neighboring terminals associated with a forwarding expectation of the measured data of the at least one mobile terminal is determined. The forwarding demand may comprise a demand for starting forwarding or switching a forwarding mode caused by triggering forwarding of the measured data or triggering the switch of the forwarding mode of the measured data. The "neighboring terminals" refers to any other mobile terminals. The distribution state of the neighboring terminal comprises at least one of the following: number, density, and the like. The forwarding expectation may comprise, but is not limited to, at least one of the following: a target forwarding coverage area, a target forwarding number, that is, a target number of mobile terminals capable of receiving the measured data, and the like. The forwarding expectation can be determined in any way or can be determined according to the measured data of the mobile terminal, for example, if it is deduced from a moving speed and a braking situation of the mobile terminal that the mobile terminal is braking in emergency and may be in an accident scenario, a larger target forwarding coverage area is determined.

A second determination module 340 is configured to at least according to the distribution state, a forwarding mode of the measured data corresponding to the distribution state, wherein, in the determined forwarding mode, the measured data of the at least one mobile terminal is to be forwarded by at least one type of forwarding node, and the at least one type of forwarding node comprises at least one type of forwarding node with a type different from that of forwarding nodes in other forwarding modes.

In an apparatus of the present embodiment, the type of the forwarding node comprises, but is not limited to, at least one neighboring terminal and the base station of a cell to which the mobile terminal attaches. The corresponding forwarding mode may comprise: a forwarding mode where only taking at least one neighboring terminal as a forwarding node; a forwarding mode where taking at least one neighboring terminal and a base station of a cell to which the mobile terminal attaches as forwarding nodes; and a forwarding mode where only taking the base station of a cell to which the mobile terminal attaches as a forwarding node. In the case where at least one neighboring terminal serves as a forwarding node, a corresponding forwarding channel is performing forwarding among respective neighboring terminals; In the case where taking the base station of a cell to which the mobile terminal attaches as a forwarding node, a forwarding channel comprises performing forwarding to another mobile terminal in the present cell through the base station, or performing forwarding to a base station in a neighboring cell through the base station, so as to achieve a broader forwarding coverage area through the base station of the neighboring cell, or performing forwarding to another mobile terminal in the present cell and a base station in the neighboring cell through the base station; In the case where both the base station of the cell to which the mobile terminal attaches and each neighboring terminal serve as forwarding nodes, a forwarding channel is a combination of the foregoing forwarding channels or the like.

The distribution state can directly reflect a forwarding condition of the measured data of the at least one mobile terminal, and on the basis of the distribution state, a more effective forwarding mode can be determined. For example, if the distribution of a neighboring terminals associated with the forwarding expectation of the measured data is relatively dense, overall forwarding coverage in this forwarding range can be achieved in just a D2D communication manner. If distribution of the neighboring terminals in the target forwarding coverage area is less dense, more hops and/or more forwarding nodes may be needed to achieve the overall forwarding coverage in this forwarding range in D2D and DSRC communication manners, or in a DSRC communication manner; alternatively, if the looseness level of distribution of the mobile terminals in the expected forwarding range goes beyond a D2D forwarding capability and/or a DSRC forwarding capability, and the overall forwarding coverage in the target forwarding coverage area cannot be achieved, a manner of using the base station of the cell to which the mobile terminal attaches as a forwarding node may be adopted, wherein the base station forwards the measured data directly to the present cell or indirectly to a neighboring terminal in a neighboring cell, so as to achieve the overall forwarding coverage in the target forwarding coverage area.

The apparatus of the present embodiment can select, in response to a forwarding demand of the measured data, a corresponding forwarding mode according to a distribution state of a neighboring terminals, so as to avoid problems, such as signaling overhead, delay, and an over heavy air interface burden, that may be caused by blindly determining a forwarding channel, and assist in implementing more effective forwarding.

Figure 3B:
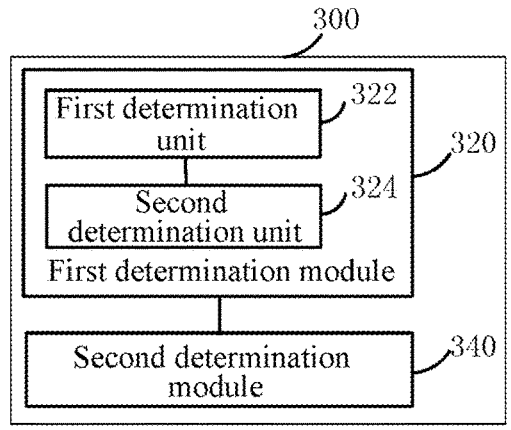

As shown in FIG. 3(b), the first determination module 320 may further comprise: a first determination unit 322 and a second determination unit 324.

In an example embodiment, the forwarding expectation of the at least one mobile terminal comprises information associated with the target forwarding coverage area. In such an example embodiment:

The first determination unit 322 is configured to determine, at least according to the forwarding expectation of the at least one mobile terminal, a target forwarding coverage area.

The second determination unit 324 is configured to determine, at least according to information associated with a position of a neighboring terminal in the determined target forwarding coverage area, a distribution state of neighboring terminals in the target forwarding coverage area.

Information associated with a position of a neighboring terminal can be determined according to a signal sent from the neighboring terminal. For example, a V2V signal sent by the neighboring terminal comprises information associated with its position relationship (GPS information). Alternatively, from the base station of the cell to which the at least one mobile terminal attaches, position information of a neighboring terminal in this cell can be directly acquired, or position information of a neighboring terminal in the neighboring cell can be indirectly acquired.

In another example embodiment, a first determination unit 322 is configured to determine, at least according to a direct transmission coverage area of the at least one mobile terminal, respective target forwarding coverage area of each of the at least one mobile terminal.

Figure 2A:
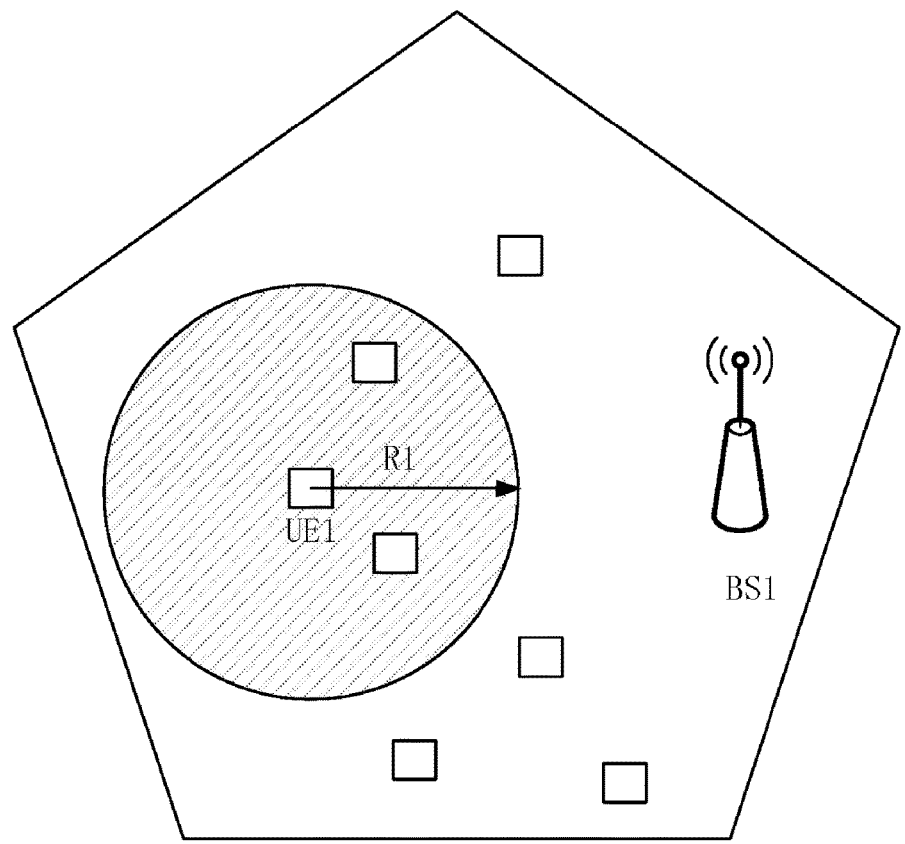
FIG. 2(a) to FIG. 2(b) are example schematic diagrams of mobile scenarios of two examples.

The direct transmission coverage area refers to a transmission coverage area of a D2D or DSRC signal of the mobile terminal, and as shown in FIG. 2(a), a maximum transmission distance of a D2D signal of UE1 in a cell coveraged by a base station BS1 is R1, and a direct transmission coverage area thereof is a circular shadowed area with UE1 as a center of circle and R1 as a radius. Therefore, a target forwarding coverage area of UE1 could be determined.

The second determination unit 324 is configured to determine, at least according to a signal received by the at least one mobile terminal from another neighboring terminal, a distribution state of neighboring terminals in the target forwarding coverage area.

According to a signal received by the at least one mobile terminal from a neighboring terminal, a relative position relationship between the at least one mobile terminal and the neighboring terminal corresponding to the signal could be deduced, or the signal may comprise information associated with the position of the corresponding neighboring terminal, for example, a V2V signal sent by the neighboring terminal comprises information associated with its position relationship (GPS information). Further, a distribution state of neighboring terminals in the target forwarding coverage area is determined.

In another example embodiment, the forwarding expectation does not clarify a target forwarding coverage area, but comprises information such as an expected forwarding number only. In such an example embodiment, the target forwarding coverage area may be deduced according to the forwarding expectation. Specifically, the first determination unit 322 is configured to determine at least one expected forwarding coverage area of each of the at least one mobile terminal.

At least one expected forwarding coverage area can be determined in sequence or at the same time for each mobile terminal.

The second determination unit 324 is configured to determine, respective at least according to a distribution state of a neighboring terminal in the at least one expected forwarding coverage area of each of the at least one mobile terminal and the forwarding expectation of the at least one mobile terminal, a target forwarding coverage area of each of the at least one mobile terminal.

As stated above, a coverage area of neighboring terminals in the at least one expected forwarding coverage may be determined according to a signal sent by the neighboring terminal, or position information of a neighboring terminal in the cell directly acquired from the base station of the cell to which the at least one mobile terminal attaches, or position information of a neighboring terminal in a neighboring cell indirectly acquired from the base station of the cell to which the at least one mobile terminal attaches, and an expected forwarding coverage area that can satisfy or almost satisfy the forwarding expectation is determined, according to a forwarding expectation of each mobile terminal, as the target forwarding coverage area.

Figure 2B:
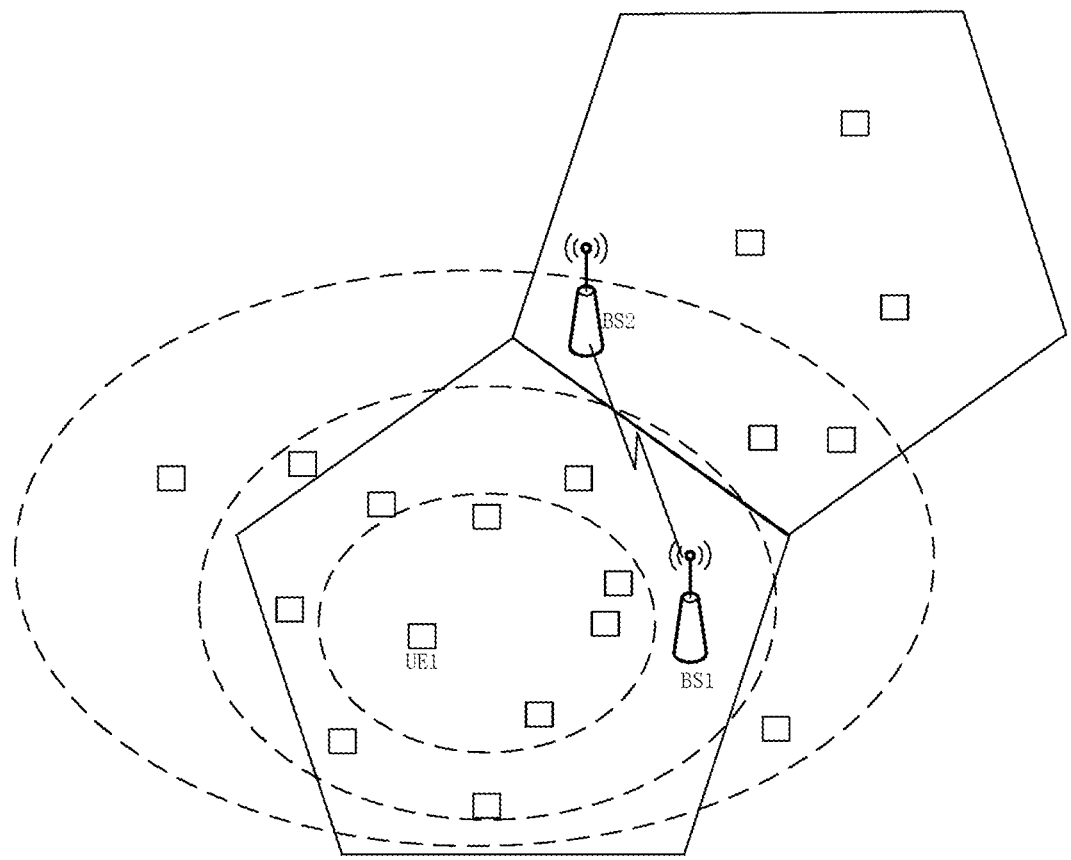

As shown in FIG. 2(b), a forwarding target of UE1 is that the number of neighboring terminals capable of receiving the measured data of UE1 is a first number. Three expected forwarding coverage areas (shown as three dashed-line circles) can be determined at the same time or in sequence for UE1 in the cell coveraged by BS1, according to a V2V signal of another UE in the present cell, a base station BS1 in the present cell, and communication between a neighboring cell base station BS2 and the present base station BS1, a distribution state of neighboring terminals in each expected coverage area can be determined, and it is determined that the number of neighboring terminals in the middle expected forwarding coverage area can satisfy the forwarding target, so as to determine the target forwarding coverage area of the middle expected forwarding coverage area.

Alternatively, information associated with a position of a neighboring terminal can be determined according to a signal sent from the neighboring terminal. For example, a V2V signal sent by the neighboring terminal comprises information associated with its position relationship (GPS information). Alternatively, from the base station of the cell to which the at least one mobile terminal attaches, position information of a neighboring terminal in this cell can be directly acquired, or position information of a neighboring terminal in the neighboring cell can be indirectly acquired.

Figure 3C:
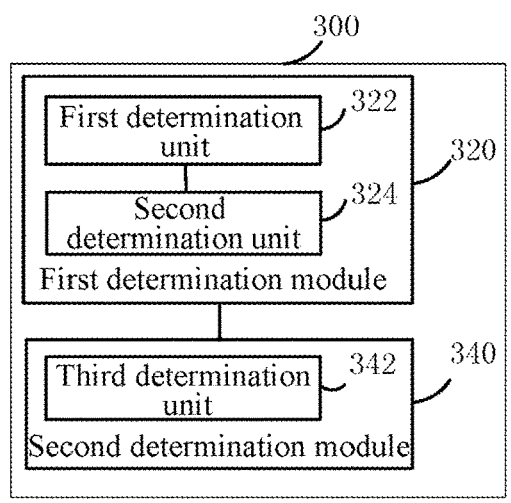

In addition, as stated above, according to a distribution state of neighboring terminals associated with the forwarding expectation of the measured data of the at least one mobile terminal, a needed forwarding node can be determined, so as to further determine different forwarding modes corresponding to different forwarding nodes, that is, as shown in FIG. 3(c), the second determination module 340 further comprises:

a third determination unit 342, configured to determine, at least according to the distribution state, at least one forwarding node associated with the measured data corresponding to the distribution state.

In an example embodiment, the third determination unit 342 may be further configured to determine, in response to that the distribution state satisfies a preset condition, at least one neighboring terminal corresponding to the distribution state as the at least one forwarding node. Accordingly, the determined at least one forwarding node may correspond to a forwarding mode of forwarding measured data in a D2D communication manner and/or a DSRC communication manner.

The third determination unit 342 is further configured to determine, in response to that the distribution state does not satisfy the preset condition, a base station of a cell to which a mobile terminal corresponding to the distribution state attaches as the at least one forwarding node. Accordingly, the corresponding forwarding mode is a forwarding mode of forwarding measured data in a communication manner of forwarding measured data directly to a neighboring terminal in the present cell and/or indirectly to a neighboring terminal in a neighboring cell through a base station of the cell to which the mobile terminal attaches or in a D2D communication manner and/or a DSRC communication manner at the same time.

The preset condition can be determined according to requirements of the system on the forwarding, for example, the preset condition is properly set according to a requirement on a channel congestion level, a delay requirement, and an air interface load requirement, for example, the preset condition is set to be that the distribution density of neighboring terminals is higher than a threshold, wherein the threshold is such a value satisfying that if the distribution density is the threshold, overall coverage in the target forwarding coverage area can be achieved by performing forwarding in a D2D manner and/or a DSRC manner.

Figure 3D:
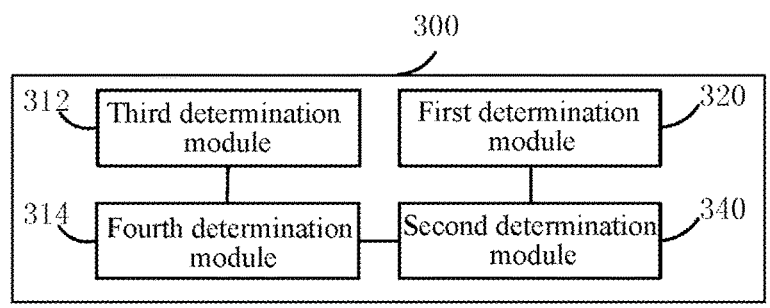

In addition, setting the preset condition is affected, to some extent, by a motion state of the mobile terminal. For example, taking a threshold of the distribution density is used as an example, compared to the mobile terminal traveling at a relatively low speed, the relatively high speed would prolong an effective transmission distance of a D2D or a DSRC signal thereof. Therefore, when the mobile terminal travels at a relatively slow speed, the threshold could be properly increased; otherwise, the threshold could be decreased. As shown in FIG. 3(d), the apparatus 300 of the present embodiment further comprises:

a third determination module 312, configured to determine a motion state of the at least one mobile terminal.

In the case where the apparatus of the present embodiment is independent from any mobile terminal, information associated with the motion state could be acquired in a manner of communicating with the mobile terminal, for example, acquiring a motion speed thereof.

A fourth determination module 314 is configured to determine, at least according to the motion state of the at least one mobile terminal, the preset condition corresponding to each of the at least one mobile terminal.

Figure 3E:
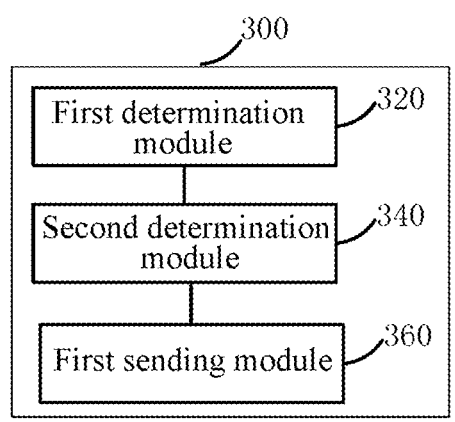

In an example embodiment in which the apparatus of the present embodiment belongs to any mobile terminal, as shown in FIG. 3(e), the apparatus 300 of the present embodiment may further comprise:

a first sending module 360 configured to send, according to the determined forwarding mode, the measured data corresponding to the at least one mobile terminal to at least one forwarding node, so as to implement effective forwarding.

Figure 3F:
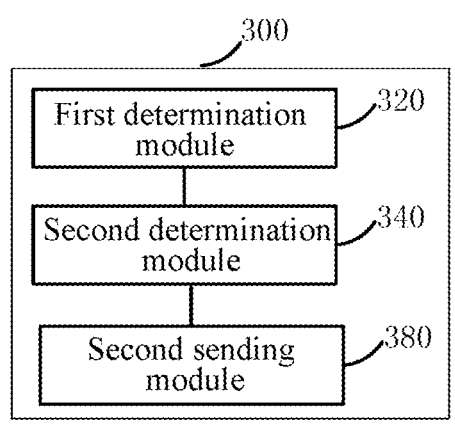

In an example embodiment in which the apparatus of the present embodiment is independent from any mobile terminal, as shown in FIG. 3(f), the apparatus 300 of the present embodiment may further comprise:

a second sending module 380, configured to send information associated with the determined forwarding mode, for example, send the information in a manner in which the mobile terminal can receive the information.

In this regard, the apparatus of the present embodiment can assist in implementing effective forwarding.

Methods and apparatuses of embodiments of the present application are further described by using the following specific examples.

Example 1

In response to a demand for switching a forwarding channel, a user of a vehicle determines vehicle density in a direct transmission range of its DSRC signal and chooses, when the vehicle density is relatively great, to use a neighboring vehicle to help forward his or her V2V measured data in a DSRC communication manner.

Example 2

When traveling on a highway between cities, a user of a vehicle determines that distribution density of neighboring vehicles is relatively low within a target forwarding coverage area, but the speed of his or her vehicle is very high, so as to determine to use a base station of a cell to which he or she attaches to help forward his or her V2V measured data. In a particularly open geographic environment, the user of the vehicle may use the base station of the cell to which he or she belongs to request more neighboring base stations (for example, multiple base stations in a traveling direction along the highway) to help forward his or her V2V measured data.

Figure 4:
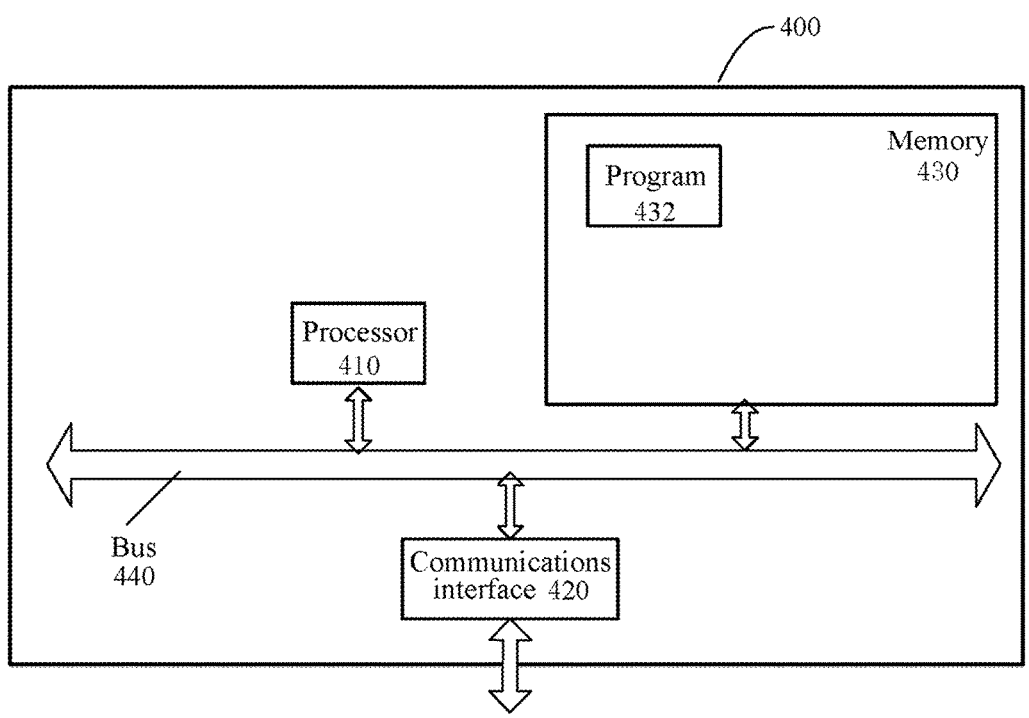
FIG. 4 is an example schematic structural diagram of another example of a forwarding control apparatus of an embodiment of the present application.

FIG. 4 is a schematic structural diagram of a forwarding control apparatus 400 according to an embodiment of the present application. The specific embodiments of the present application are not intended to limit the specific implementation of the forwarding control apparatus 400. As shown in FIG. 4, the forwarding control apparatus 400 may comprise:

a processor 410, a communications interface 420, a memory 430, and a communications bus 440.

The processor 410, the communications interface 420, and the memory 430 communicate with each other by using the communications bus 440.

The communications interface 420 is configured to communicate with a network element such as a client.

The processor 410 is configured to execute a program 432, and specifically can implement relevant functions of the forwarding control apparatus in the apparatus embodiment shown in FIG. 3(a).

Specifically, the program 432 may comprise program code, wherein the program code comprises a computer operation instruction.

The processor 410 may be a central processing unit (CPU), an application specific integrated circuit (ASIC), or one or more integrated circuits configured to implement the embodiments of the present application. The program 432 may be used for enabling the forwarding control apparatus 400 to perform the following steps:

at least determining, in response to a forwarding demand of measured data of at least one mobile terminal, a distribution state of neighboring terminals associated with a forwarding expectation of the measured data of the at least one mobile terminal; and determining, at least according to the distribution state, a forwarding mode of the measured data corresponding to the distribution state, wherein, in the determined forwarding mode, the measured data of the at least one mobile terminal is to be forwarded by at least one type of forwarding node, and the at least one type of forwarding node comprises at least one type of forwarding node with a type different from that of forwarding nodes in other forwarding modes.

For the steps in the program 432, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Although the subject matter is described herein in the general context of program modules that execute in conjunction with an application program that runs on an operating system on a computer system, a person skilled in the art will recognize that the subject matter may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The above implementations are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:
   at least determining, by a system comprising a processor and in response to a forwarding demand of measured data of at least one mobile terminal, a distribution state of neighboring terminals associated with a forwarding expectation of the measured data of the at least one mobile terminal, wherein the forwarding expectation comprises at least one of a target forwarding coverage area or a target forwarding number; and
   determining, by the system at least according to the distribution state, a forwarding mode of the measured data corresponding to the distribution state,
   wherein:
      in the forwarding mode, the measured data of the at least one mobile terminal is to be forwarded by at least one type of forwarding node, and the at least one type of forwarding node comprises a first type of forwarding node with a type different from that of a second type of at least one other forwarding node, and the type of the forwarding node further comprises at least one neighboring terminal and a base station of a cell to which the mobile terminal attaches,
      in response to the at least one neighboring terminal serving as a forwarding node, performing, via a corresponding forwarding channel, forwarding among the neighboring terminals, and
      in response to taking the base station of the cell to which the mobile terminal attaches as a forwarding node, a forwarding channel comprises: performing forwarding to another mobile terminal in the cell through the base station, or performing forwarding to a base station in a neighboring cell through the base station, or performing forwarding to another mobile terminal in the cell and the base station in the neighboring cell through the base station.

2. The method of claim 1, wherein at least the determining the distribution state of the neighboring terminals associated with the forwarding expectation of the measured data of the at least one mobile terminal comprises:
   determining, at least according to the forwarding expectation of the at least one mobile terminal, a target forwarding coverage area; and
   determining, at least according to information associated with a position of a neighboring terminal in the target forwarding coverage area, the distribution state.

3. The method of claim 1, wherein at least the determining the distribution state of the neighboring terminals associated with the forwarding expectation of the measured data of the at least one mobile terminal comprises:
   determining, at least according to a direct transmission coverage area of the at least one mobile terminal, a target forwarding coverage area of each of the at least one mobile terminal; and
   determining, at least according to a signal received by the at least one mobile terminal from another neighboring terminal, a distribution state of a set of neighboring terminals in the target forwarding coverage area.

4. The method of claim 1, wherein at least the determining the distribution state of the neighboring terminals associated with the forwarding expectation of the measured data of the at least one mobile terminal comprises:
   determining at least one expected forwarding coverage area of each of the at least one mobile terminal; and
   determining, at least according to the distribution state of the neighboring terminals in the at least one expected forwarding coverage area of each of the at least one mobile terminal and the forwarding expectation of the at least one mobile terminal, a target forwarding coverage area of each of the at least one mobile terminal.

5. The method of claim 1, wherein: the determining, at least according to the distribution state, the forwarding mode of the measured data corresponding to the distribution state comprises:
   determining, at least according to the distribution state, at least one forwarding node associated with the measured data corresponding to the distribution state.

6. The method of claim 5, wherein the determining the at least one forwarding node associated with the measured data corresponding to the distribution state comprises:
   determining, in response to determining that the distribution state satisfies a preset condition, at least one neighboring terminal corresponding to the distribution state as the at least one forwarding node.

7. The method of claim 6, wherein the determining the at least one forwarding node associated with the measured data corresponding to the distribution state comprises:
   determining, in response to determining that the distribution state does not satisfy the preset condition, a base station of a cell to which the at least one mobile terminal corresponding to the distribution state attaches as the at least one forwarding node.

8. The method of claim 6, further comprising:
   determining, by the system, a motion state of the at least one mobile terminal; and
   determining, by the system at least according to the motion state of the at least one mobile terminal, the preset condition corresponding to each of the at least one mobile terminal.

9. The method of claim 8, wherein the motion state comprises a motion speed of the at least one mobile terminal.

10. The method of claim 1, further comprising:
    sending, by the system according to the forwarding mode, the measured data corresponding to the at least one mobile terminal to at least one forwarding node.

11. The method of claim 1, further comprising:
    sending, by the system, information associated with the forwarding mode.

12. The method of claim 1, wherein the measured data comprises information of the at least one mobile terminal associated with at least one of: a motion speed of the at least one mobile terminal, a position of the at least one mobile terminal, a motion direction of the at least one mobile terminal, and a braking of the at least one mobile terminal.

13. The method of claim 1, wherein the distribution state comprises at least one of:
    a number of the neighboring terminals or a density of the neighboring terminals.

14. An apparatus, comprising:
    a memory that stores executable modules; and
    a processor, coupled to the memory, that executes the executable modules to perform operations comprising:
      determining, in response to a forwarding demand of measured data of at least one mobile terminal, a distribution state of neighboring terminals associated with a forwarding expectation of the measured data of the at least one mobile terminal, wherein the forwarding expectation comprises at least one of a target forwarding coverage area or a target forwarding number; and
      determining, at least according to the distribution state, a forwarding mode of the measured data corresponding to the distribution state,
    wherein:
      in the forwarding mode, the measured data of the at least one mobile terminal is to be forwarded by a forwarding node of at least one type, and the at least one type of forwarding node comprises a type of forwarding node that is different from that of other forwarding modes, and the type of the forwarding node further comprises at least one neighboring terminal and a base station of a cell to which the mobile terminal attaches,
      in response to the at least one neighboring terminal serving as a forwarding node, performing, via a corresponding forwarding channel, forwarding among the neighboring terminals, and
      in response to taking the base station of the cell to which the mobile terminal attaches as a forwarding node, a forwarding channel comprises: performing forwarding to another mobile terminal in the cell through the base station, or performing forwarding to a base station in a neighboring cell through the base station, or performing forwarding to another mobile terminal in the cell and the base station in the neighboring cell through the base station.

15. The apparatus of claim 14, wherein the operations further comprise:
    determining, at least according to the forwarding expectation of the at least one mobile terminal, a target forwarding coverage area; and
    determining, at least according to information associated with a position of a neighboring terminal in the target forwarding coverage area, the distribution state.

16. The apparatus of claim 14, wherein the operations further comprise:
    determining, at least according to a direct transmission coverage area of the at least one mobile terminal, a target forwarding coverage area of each of the at least one mobile terminal; and
    determining, at least according to a signal received by the at least one mobile terminal from another neighboring terminal, a distribution state of neighboring terminals in the target forwarding coverage area.

17. The apparatus of claim 14, wherein the operations further comprise:
    determining at least one expected forwarding coverage area of each of the at least one mobile terminal; and
    determining, at least according to a distribution state of neighboring terminals in the at least one expected forwarding coverage area of each of the at least one mobile terminal and the forwarding expectation of the at least one mobile terminal, a target forwarding coverage area of each of the at least one mobile terminal.

18. The apparatus of claim 14, wherein the operations further comprise:
    determining, at least according to the distribution state, at least one forwarding node associated with the measured data corresponding to the distribution state.

19. The apparatus of claim 18, wherein the operations further comprise determining, in response to that the distribution state satisfies a preset condition, at least one neighboring terminal corresponding to the distribution state as the at least one forwarding node.

20. The apparatus of claim 19, wherein the operations further comprise determining, in response to that the distribution state does not satisfy the preset condition, a base station of a cell to which a mobile terminal corresponding to the distribution state attaches as the at least one forwarding node.

21. The apparatus of claim 19, wherein the operations further comprise:
    determining a motion state of the at least one mobile terminal; and
    determining, at least according to the motion state of the at least one mobile terminal, the preset condition corresponding to each of the at least one mobile terminal.

22. The apparatus of claim 14, wherein the operations further comprise:
    sending, according to the forwarding mode, the measured data corresponding to the at least one mobile terminal to at least one forwarding node.

23. The apparatus of claim 14, wherein the operations further comprise:
    sending information associated with the forwarding mode.

24. A computer readable storage device, comprising at least one executable instruction, which, in response to execution, causes a system comprising a processor to perform operations, comprising:
    at least determining, in response to a forwarding demand of measured data of a mobile terminal, a distribution state of neighboring terminals associated with a forwarding expectation of the measured data of the mobile terminal, wherein the forwarding expectation comprises at least one of a target forwarding coverage area or a target forwarding number; and determining, at least according to the distribution state, a forwarding mode of the measured data corresponding to the distribution state, wherein:
- in the forwarding mode, the measured data of the mobile terminal is to be forwarded by at least one type of forwarding node, and the at least one type of forwarding node comprises at least one type of forwarding node with a type different from that of other forwarding modes, and the type of the forwarding node further comprises at least one neighboring terminal and a base station of a cell to which the mobile terminal attaches,
- in response to the at least one neighboring terminal serving as a forwarding node, performing, via a corresponding forwarding channel, forwarding among the neighboring terminals, and
- in response to taking the base station of the cell to which the mobile terminal attaches as a forwarding node, a forwarding channel comprises: performing forwarding to another mobile terminal in the cell through the base station, or performing forwarding to a base station in a neighboring cell through the base station, or performing forwarding to another mobile terminal in the cell and the base station in the neighboring cell through the base station.

25. A device comprising a processor and memory, wherein the memory stores executable instructions, the processor being connected with the memory via a communication bus, and when the device is operating, the processor executes or facilitates execution of the executable instructions stored by the memory to perform operations, comprising:

at least determining, in response to a forwarding demand of measured data of at least one mobile terminal, a distribution state of neighboring terminals associated with a forwarding expectation of the measured data of the at least one mobile terminal, wherein the forwarding expectation comprises at least one of a target forwarding coverage area or a target forwarding number; and determining, at least according to the distribution state, a forwarding mode of the measured data corresponding to the distribution state, wherein:
- in the forwarding mode, the measured data of the at least one mobile terminal is to be forwarded by at least one type of forwarding node, and the at least one type of forwarding node comprises at least one type of forwarding node with a type different from that of forwarding nodes in other forwarding modes, and the type of the forwarding node further comprises at least one neighboring terminal and a base station of a cell to which the mobile terminal attaches,
- in response to the at least one neighboring terminal serving as a forwarding node, performing, via a corresponding forwarding channel, forwarding among the neighboring terminals, and
- in response to taking the base station of the cell to which the mobile terminal attaches as a forwarding node, a forwarding channel comprises: performing forwarding to another mobile terminal in the cell through the base station, or performing forwarding to a base station in a neighboring cell through the base station, or performing forwarding to another mobile terminal in the cell and the base station in the neighboring cell through the base station.

* * * * *